United States Patent
Billore et al.

(10) Patent No.: US 10,102,490 B2
(45) Date of Patent: *Oct. 16, 2018

(54) OPTIMIZATION OF WORKLOAD PLACEMENT

(71) Applicant: International Business Machines Corporation, Armonk, NY (US)

(72) Inventors: Ashish Billore, Bangalore (IN); Sudipta Biswas, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 5 days.

This patent is subject to a terminal disclaimer.

(21) Appl. No.: 15/184,323

(22) Filed: Jun. 16, 2016

(65) Prior Publication Data

US 2016/0292609 A1    Oct. 6, 2016

Related U.S. Application Data

(63) Continuation of application No. 14/108,701, filed on Dec. 17, 2013, now Pat. No. 9,417,923.

(51) Int. Cl.
*G06F 9/46* (2006.01)
*G06Q 10/06* (2012.01)
*G06F 9/50* (2006.01)

(52) U.S. Cl.
CPC ..... *G06Q 10/06316* (2013.01); *G06F 9/5038* (2013.01); *G06F 9/5083* (2013.01); *G06F 2209/506* (2013.01); *G06F 2209/5021* (2013.01)

(58) Field of Classification Search
None
See application file for complete search history.

(56) References Cited

U.S. PATENT DOCUMENTS 8,291,411 B2   10/2012   Beaty et al.
2011/0173626 A1   7/2011   Chi et al.
(Continued)

FOREIGN PATENT DOCUMENTS

CN   103002053 A   3/2013

OTHER PUBLICATIONS

Antonescu, A.F. et al. "Dynamic SLA Management with Forecasting using Multi-Objective Optimizations". Publication Year: 2013. <http://cds.unibe.ch/researchipub_files/AB13.pdf>.
(Continued)

*Primary Examiner* — Emerson Puente
*Assistant Examiner* — Steven Do
(74) *Attorney, Agent, or Firm* — Tihon Poltavets

(57) ABSTRACT

A computer manages methods for determining workload placement in a computing environment. The computer receives a plurality of workloads with associated information, wherein the associated information for each workload contains at least: contract information, billing information, and resource availability information. The computer determines a profitability factor for each workload of the plurality of workloads, wherein the profitability factor is at least based on the billing information. The computer determines a penalty factor for each workload of the plurality of workloads, wherein the penalty factor is at least based on the contract information. The computer determines a preference factor for each workload of the plurality of workloads, wherein the preference factor is at least based on the resource availability information. The computer assigns a priority ordering for each of the workloads from the plurality of workloads.

17 Claims, 4 Drawing Sheets

(56) References Cited

U.S. PATENT DOCUMENTS

| | | |
|---|---|---|
| 2012/0022910 A1 | 1/2012 | Chi et al. |
| 2012/0023501 A1 | 1/2012 | Chi et al. |
| 2012/0066020 A1 | 3/2012 | Moon et al. |
| 2012/0198462 A1 | 8/2012 | Cham et al. |
| 2013/0185433 A1 | 7/2013 | Zhu et al. |
| 2014/0074671 A1 | 3/2014 | Rothschild |

OTHER PUBLICATIONS

Burge, J. et al. Cost-aware Scheduling for Heterogeneous Enterprise Machines (CASH'EM). Copyright 2007 Hewlett-Packard Development Company, L.P. Palo Alto.

Goiri, I. et al. "Energy-efficient and multifaceted resource management for profit-driven virtualized data centers". Future Generation Computer Systems 28 (2012). pp. 718-731. Copyright 2012 Elsevier.

Liu, Z. et al. "Profit-driven Cloud Service Request Scheduling Under SLA Constraints". Journal of Information & Computational Science 9:14 (2012). pp. 4065-4071 Available at http://www.joics.com. Copyright 2012 Binary Information Press. Nov. 15, 2012.

Xiao, J. and Wang, Z. "A Priority based Scheduling Strategy for Virtual Machine Allocation in Cloud Computing Environment". pp. 50-55. Cloud and Service Computing (CSC), 2012. Copyright 2012 IEEE.

OPTIMIZATION OF WORKLOAD PLACEMENT

FIELD OF THE INVENTION

The present invention relates generally to workloads, and more particularly, to optimizing workload placement in cloud computing.

BACKGROUND

Cloud computing is typically used to describe a variety of computing concepts that involve a large quantity of computers connected over a network (e.g., internet connection). These computing concepts of cloud computing often include a collection of server computers, where the server computers run a number of workloads that are received from the users of the cloud. The workloads, along with virtual server hosting, often have a limited amount of physical resources capable of fulfilling such services. A cloud service provider typically has to maintain an infrastructure for cloud computing, where the infrastructure can consist of server computers, storage, networks, software, cooling systems, and any other type of overhead associated with cloud computing infrastructures.

The amount of workloads the cloud service provider receives can exceed the operational boundaries of the infrastructure. For example, there may not be enough computing power to run the workloads, resulting in workloads being placed in a queue. For the cloud service provider, this may not be an optimal business plan, since certain workloads may have higher priority than other workloads based on a number of factors. Typically, for the cloud service provider, an important aspect of optimal placement of workloads is the placement providing maximum profits and minimizing losses in proportion to operational costs.

SUMMARY

Embodiments of the present invention disclose a method, computer program product and computer system for determining workload placement in a computing environment. A computer receiving, by one or more processors, a plurality of workloads with associated information, wherein the associated information for each workload contains at least: contract information, billing information, and resource demand information; determining, by one or more processors, a profitability factor for each workload of the plurality of workloads, wherein the profitability factor is at least based on the billing information; determining, by one or more processors, a penalty factor for each workload of the plurality of workloads, wherein the penalty factor is at least based on the contract information; determining, by one or more processors, a preference factor for each workload of the plurality of workloads, wherein the profitability factor and the penalty factor are utilized to determine the preference factor and the preference factor is at least based on the resource availability information and a preferred time of day for running each work workload; and assigning, by one or more processors, a priority ordering for each of the workloads from the plurality of workloads based upon at least: the profitability factor, the penalty factor, and the preference factor.

DETAILED DESCRIPTION

Figure 1:
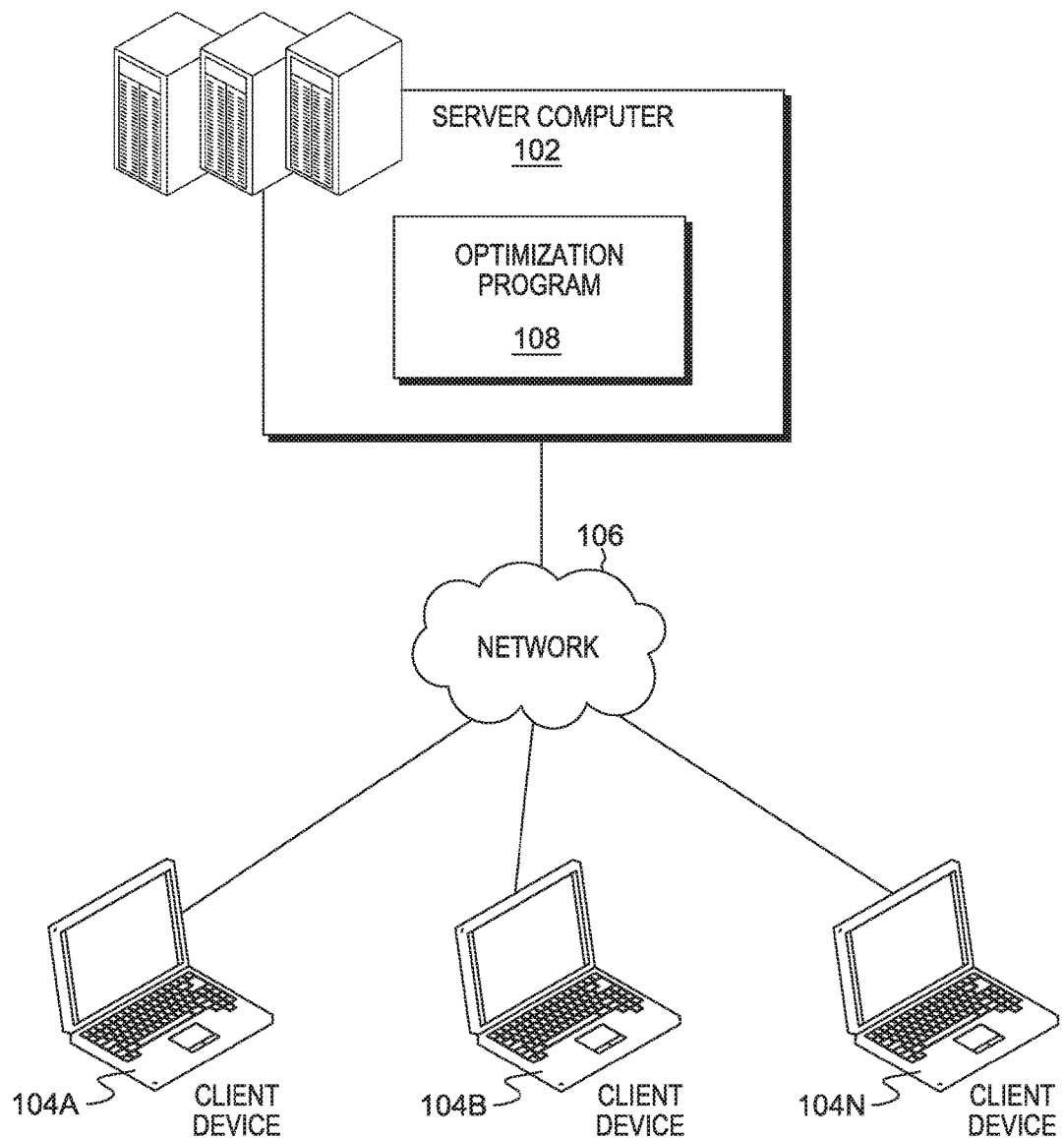
FIG. 1 is a functional block diagram illustrating a distributed data processing environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable media having computer readable program code/instructions embodied thereon.

Any combination of computer-readable media may be utilized. Computer-readable media may be a computer-readable signal medium or a computer-readable storage medium. A computer-readable storage medium may be, for example, but is not limited to, an electronic, magnetic, optical, electromagnetic, or semiconductor system, apparatus, or device, or any suitable combination of the foregoing. More specific examples (a non-exhaustive list) of a computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, Python, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

FIG. 1 is a functional block diagram illustrating a distributed data processing environment, in accordance with one embodiment of the present invention. Distributed data processing environment includes server computer 102 and client devices 104A, 104B, and 104N interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other client devices via a network. In this embodiment, server computer 102 has the ability to communicate with other client devices to query the client devices for information.

Optimization program 108 residing in server computer 102 has the ability to receive details about workloads sent from various client devices, designated client devices 104A, 104B, and 104N. Optimization program 108 can also receive information pertaining to each of the workloads and optimization program 108 can determine a profitability factor, a penalty factor, and a preference factor for each of the workloads based on the received information. Based on the factors, optimization program 108 can assign priority ordering to each of the received workloads.

Optimization program 108 can receive information from various tools and modules not illustrated in FIG. 1. Optimization program 108 can receive service-level agreement (SLA) information for each of the workloads from a contract module. The contract module can also provide downtime metrics and resiliency metrics for each of the workloads. Optimization program 108 can utilize the information received from the contract module to determine the SLA cost for each of the workloads. The SLA cost represents a penalty that a cloud service encounters for non-functioning workloads (i.e., queued workloads) or scheduled workloads with lesser resources than agreed in a service contract.

Optimization program 108 can receive billing related information for each of the workloads from a billing module. The billing module contains charges to a customer for workloads that, the cloud server provider receives. Optimization program 108 can utilize the information received form the billing module to provide current billing data. Optimization program 108 can receive status information of the infrastructure which the cloud service provider maintains from an inventory module. Such information can include resource availability (i.e., computing power) along with quality, operating capacity, and redundancy aspects for each of the resources. Optimization program 108 can utilize the information to selectively schedule workloads on specific resources to minimize penalties and maximize the overall profitability associated with workloads.

Optimization program 108 can utilize a capacity forecaster which reads data from various sections to forecast the utility data of a workload. A section can be open virtualization format (OVF) files, or any other similar metadata format that is used to read the static resource demands of each workload. Optimization program 108 can also utilize such metadata during a disaster recovery situation. Another section can be heuristics, which can be used to provide historical workload demands and workload trends. A matrices data section can be used to provide current data usage of a running workload. A capacity forecaster can receive information from the capacity forecaster and the inventory module to calculate an operational cost figure for each workload.

Optimization program 108 can utilize a profit engine which receives information from all the various modules. The profit engine of optimization program 108 can specify which workloads to run to maximize profits, which workloads to suspend during certain situations, and which high priority workloads to assign to more reliable hardware components. Optimization program 108 can continuously run to evaluate such parameters in real time and adjust the profitability factor, the penalty factor, and the preference factors for various workloads, thus shuffling the scheduling preference of these workloads.

In general, network 106 can be any combination of connections and protocols that will support communications between server computer 102 and client device 104A, 104B, and 104N. For discussion purposes, in this embodiment client device 104N represents a cluster of client devices, similar to client device 104A and 104B from which optimization program 108 can receive workloads. Network 106 can include, for example, a local area network (LAN), a wide area network (WAN) such as the internet, a cellular network, or any combination of the preceding, and can further include wired, wireless, and/or fiber optic connections.

In one embodiment, optimization program 108 may be a web service accessible via network 106 to a user of a separate device, not illustrated in FIG. 1. In another embodiment, optimization program 108 may be operated directly by a user of server computer 102.

In various embodiments of the present invention, client device 104 can be a laptop computer, a tablet computer, a netbook computer, a personal computer (PC), a desktop computer, a personal digital assistant (PDA), a smartphone, or any programmable electronic device capable of communicating with server computer 102 via network 106.

Figure 2:
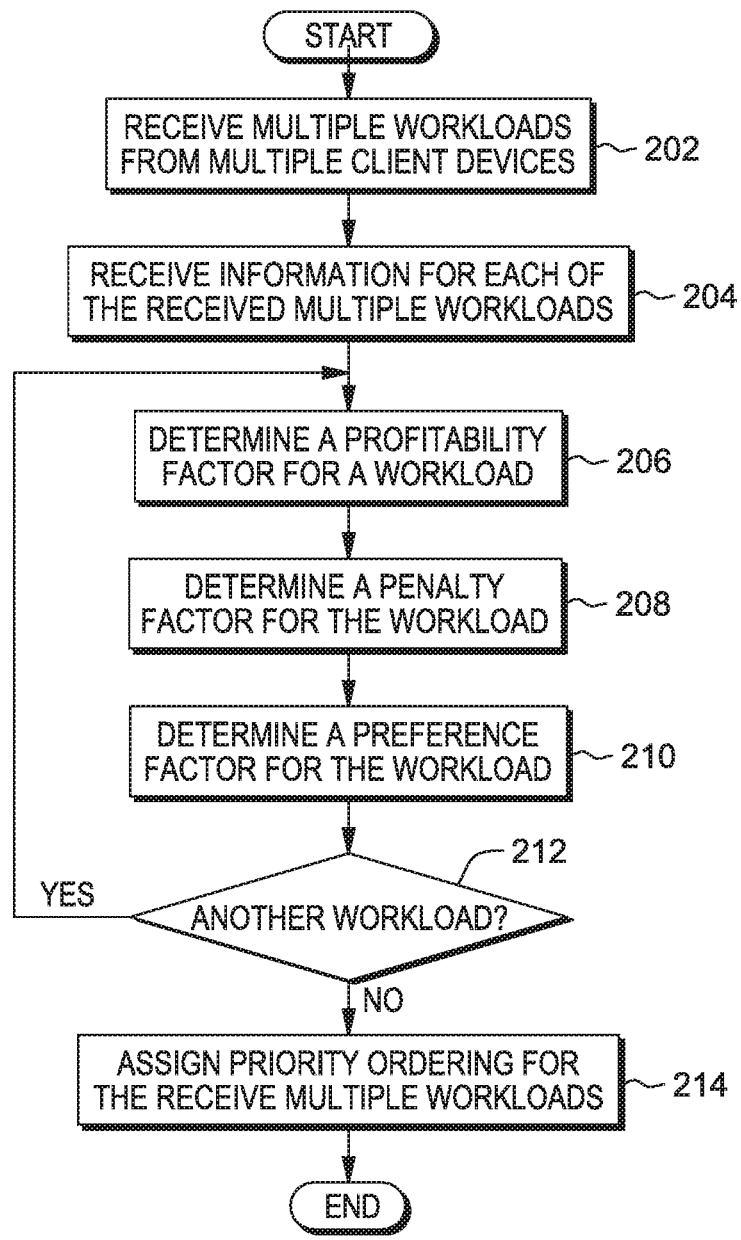
FIG. 2 is a flowchart depicting operational steps of an optimization program for assigning priority to workloads, in accordance with an embodiment of the present invention.

FIG. 2 is a flowchart depicting operational steps of an optimization program for assigning priority to workloads, in accordance with an embodiment of the present invention.

Optimization program 108 receives multiple workloads from multiple client devices (step 202). In one embodiment, a cloud service provider maintains the data center and receives workloads from various clients (i.e., client devices 104A, 104B, and 104N). For discussion purposes, each workload being received by optimization program 108 is from a different client. Each workload can have a varying degree of computing resources required from the data center.

Optimization program 108 receives information for each of the received multiple workloads (step 204). Optimization program 108 can receive information from the various modules previously mentioned in the discussion of FIG. 1. Optimization program 108 can query the various modules for the information pertaining to each of the multiple workloads. In one embodiment, the cloud service provider can have a work order number associated with each of the received multiple workloads. For example, optimization program 108 can utilize the work order number to query a billing module to obtain billing related information for the workload associated with the work order number. Optimization program 108 can further utilize the work order number to query the contract module and inventory module when obtaining information for each of the multiple workloads.

Optimization program 108 determines a profitability factor for a workload (step 206). In one embodiment, optimization program 108 can determine a ratio between profit for a workload and a cost the cloud service provider incurs from performing the workload. Optimization program 108 calculates the cost the cloud service provider incurs by determining the resource demands of the data center for the workload. For example, the resource demands can be represented by a percentage of a data center being utilized for the workload. In another example, the resource demand can be represented by an amount of storage the workload utilizes in the data center. Optimization program 108 calculates the profit for a workload by taking the customer cost and removing the cost the cloud service provider incurs from performing the workload. For the particular workload, the cloud service provider can charge cost "B" for running the particular workload. Optimization program 108 can determine the profitability factor "P" by calculating using an equation such as (P)=(B−A)/A. Optimization program 108 can store the determined profitability factor for the workload in a designated profitability factor list containing the profitability factors for the received multiple workloads.

Optimization program 108 determines a penalty factor for the workload (step 208). The penalty factor is a representation of any penalties a cloud service provider may incur if a particular workload is not handled as previously determined in a client agreement. In this embodiment, the penalty factor is a Service Level Agreement (SLA) penalty factor. The SLA penalty factor can be based on workload idle time, an amount of resources provided for a workload, or any cost incurred by the cloud service provider for breaching the SLA. Optimization program 108 can receive information to determine the penalty factor from the contract module, where the contract module contains any penalties a client can impose on the cloud service provider. The higher an amount of possible penalties for a workload, optimization program 108 determines a higher penalty factor for the workload. Similarly, the lower an amount of possible penalties for a workload, optimization program 108 determines a lower penalty factor for the workload.

In another embodiment, optimization program 108 may assign a lower penalty factor to a workload which has a lower profit factor and similarly can assign a higher penalty factor to a workload which has a higher profit factor, regardless of an amount of penalties for the workload. Since a high profit factor workload provides more business for a cloud service provider, optimization program 108 can determine a lower penalty factor to ensure priority is not affected regardless if an amount of penalties for the workload is high.

Optimization program 108 determines a preference factor for the workload (step 210). Optimization program 108 can utilize the preference factor when assigning priority ordering for the workload with respect to other workloads previously received in step 202. Optimization program 108 utilizes the determined profitability factor and penalty factor in an optimizer function to determine the preference of the workload. For example, the optimizer function of optimizer program 108 utilizes the profitability factor to maximize the function and the penalty factor to minimize the function over a given duration of time. Optimization program 108 can determine numerous preference factors for a particular workload depending on the given duration of time provided. For example, if a recurring workload needs to run at the end of a business, optimization program 108 can assign a higher preference factor to the recurring workload for a given time such as 6:00 P.M. Optimization program 108 can assign a lower preference factor to the recurring workload for a given time such as 11 A.M.

Optimization program 108 determines if there is another workload (decision step 212). If optimization program 108 determines there is another workload (yes branch, step 212), optimization program 108 reverts back to step 206 to determine a profitability factor for the other workload based on the previously received information. If optimization program 108 determines there is not another workload ("no" branch, step 212), optimization program 108 compiles all of the factors for each of the multiple workloads.

Optimization program 108 assigns priority ordering for the received multiple workloads (step 214). In this embodiment, optimization program 108 assigns priority ordering for the received workloads based on the determined preference factors of each workload. Workloads with higher preference factors rank higher than workloads with lower preference factors. Furthermore, optimization program 108 can further assign the workloads into different classes depending on the type of workloads. For example, the workload classes (e.g., Class A—Gold, Class B—Silver, and Class C—Bronze) can depend on a type of business area from which optimization program 108 receives the multiple workloads in step 202. Optimization program 108 can assign workloads to a workload class pertaining to the specific business area. Within the workload class, optimization program 108 can assign a priority rank based on the determined preference factor. Optimization program 108 can also assign priority ordering for each workload based on the determined profitability factor from step 206 and the determined penalty factor from step 208.

In another embodiment, optimization program 108 can assign priority ordering to a workload based on preference factors relative to other workloads. For example, if two workloads have the same preference factors, optimization program 108 may assign a higher priority to the workload with the higher profitability factor. In another example, when two workloads have the same preference factors, optimization program 108 may assign a higher priority to the workload with the lower penalty factor. Optimization program 108 has the ability to assign priority ordering to a workload relative to other workloads in a specific class or other workloads in all classes. Assigning priority ordering for a workload relative to other workloads allows for optimization program 108 to continuously receive work loads and maintain the priority ordering of the workloads. In another embodiment, optimization program 108 can determine not to assign priority ordering to workloads if the total number of workloads does not exceed a particular value. In such a situation, optimization program 108 assigns the workloads to the available resources.

Upon assigning priority ordering, optimization program 108 can alter the class and priority rank of each workload based on the relative profitability and liability factors of any newly received workloads. Certain situations, such as, disaster recovery and predictive failure situations, can affect the priority ordering optimization program 108 assigned. Optimization program 108 can consider such situations when performing operations such as, scheduling, migrations, placement, suspending, resuming, backup, and additional resource allocation in order to maximize profitability and minimize penalties for workloads relative to other workloads.

Figure 3:
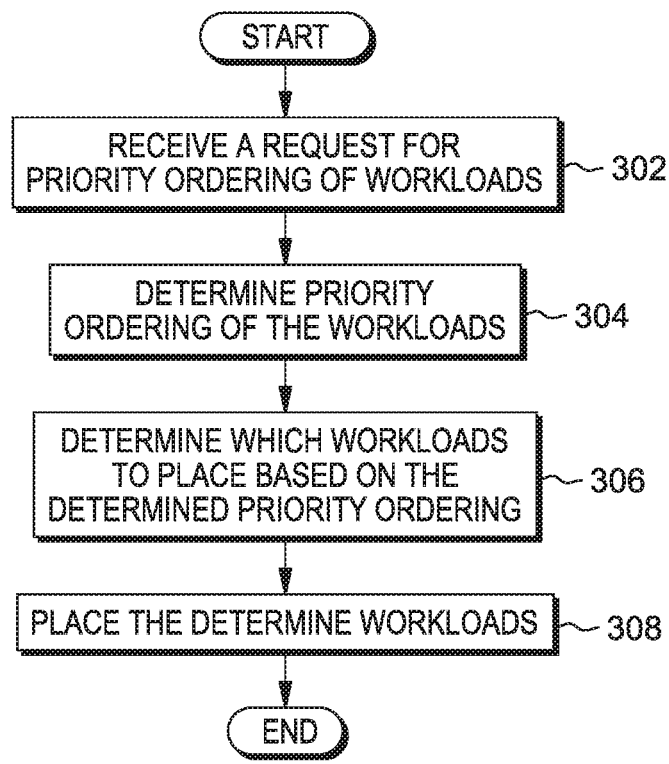
FIG. 3 is a flowchart depicting operational steps of an optimization program for utilizing priority assignment of workloads, in accordance with an embodiment of the present invention.

FIG. 3 is a flowchart depicting operational steps of an optimization program for utilizing priority assignment of workloads, in accordance with an embodiment of the present invention.

Optimization program 108 receives a request for priority ordering of workloads (step 302). The request can contain information such as, a type of situation which calls for the priority ordering of the workloads. Each situation dictates how optimization program 108 can assign priority and which factors (i.e., preference, penalty, and profitability) to base the assignment of priority on for the workloads. An example situation in which optimization program 108 can receive a request is during a predictive failure. The predictive failure can lead to the migration of virtual machines running on a given server to other servers located in an infrastructure of the cloud service provider. A workload re-distribution situation can call for optimization program 108 to provide an assignment of priority ordering for the workloads being re-distributed. In this situation, optimization program 108 can utilize the preference factors to assign priority ordering of the workloads to re-distribute the workloads according to the ordering.

Another example, in which optimization program 108 can receive a request is during new workload deployment, where there may not be enough resources in the infrastructure of the cloud service provider to perform newly deployed workloads. Optimization program 108 can utilize the penalty factor to assign priority ordering of the workloads. For example, since there may not be enough resources available for the new workloads, the workloads (i.e., current or new workloads) with the lowest penalty factor can have a lower priority compared to workloads with higher penalty factors. As a result of priority re-ordering, optimization program 108 may suspend some of the scheduled workloads, which happen to have a lower penalty factor to make resources available for workloads with higher penalty factors.

Optimization program 108 can also receive a request during a disaster recovery situation. Optimization program 108 can backup workloads with a higher preference factor compared to workloads with a lower preference factor due to the higher preference factor workloads being of higher value to the cloud service provider. Optimization program 108 can also assign recovery priority to workloads with a higher preference factor during instances when the cloud service provider has a limited recovery-window for the high priority workloads.

Optimization program 108 determines priority ordering of the workloads (step 304). Optimization program 108 utilizes the identified situation for which the priority ordering of workloads was requested to determine the priority ordering of the workloads. Each situation can have a different priority ordering of the workloads since each situation can have a particular factor (i.e., profitability, penalty, and preference) upon which the priority ordering is based. Optimization program 108 can perform the operational steps mentioned in the discussion of FIG. 2 to obtain the priority ordering of the workloads based on the particular factor which is ideal in the identified situation.

Optimization program 108 determines which workloads to place based on the determined priority ordering (step 306). In one embodiment, optimization program 108 can determine the resources available in the infrastructure and the operating constraints of each of the resources. Optimization program 108 can determine if the resources and operating capabilities of the resources can run the workloads without issue. In an example embodiment, if optimization program 108 determines there is a sufficient amount of resources to run the workloads, optimization program 108 may place all of the workloads in the priority ordering previously determined in step 304. If optimization program 108 determines there is not a sufficient amount of resources to run the workloads, optimization program 108 may place the higher priority workloads and suspend the lower priority workloads until resources become available for optimization program 108 to place the lower priority workloads.

Optimization program 108 places the determined workloads (step 308). Optimization program 108 can place particular workloads in selectively chosen resources in the infrastructure of the cloud service provider. For example, optimization program 108 can have access to a history of the reliability for each of the resources in the infrastructure. Optimization program 108 can place the high priority workloads in resources which have a reliable operating history. In another example, optimization program 108 can have access to an inventory list of resources in the infrastructure. Optimization program 108 can place the high priority workloads on resources with a high quality, high operating capacity, or high level of redundant components, where if a particular component was to fail, another component can take the place of the failed component. Placing high priority workloads in resources with a high level of redundant components ensures shorter down times for the high priority workloads. Optimization program 108 can also place the workloads according to particular time of day, week, month, or year. Optimization program 108 can schedule workloads based on preferred times when the profit factor can be maximized. For example, optimization program 108 can schedule a particular workload for "X" hours for every "Y" hours (e.g., 2 hours for every 24 hours). Optimization program 108 can determine an optimal time to provision a workload for maximum profitability through use of metadata such as, OVF information of a workload and utilize the metadata to perform scheduling assignments.

Figure 4:
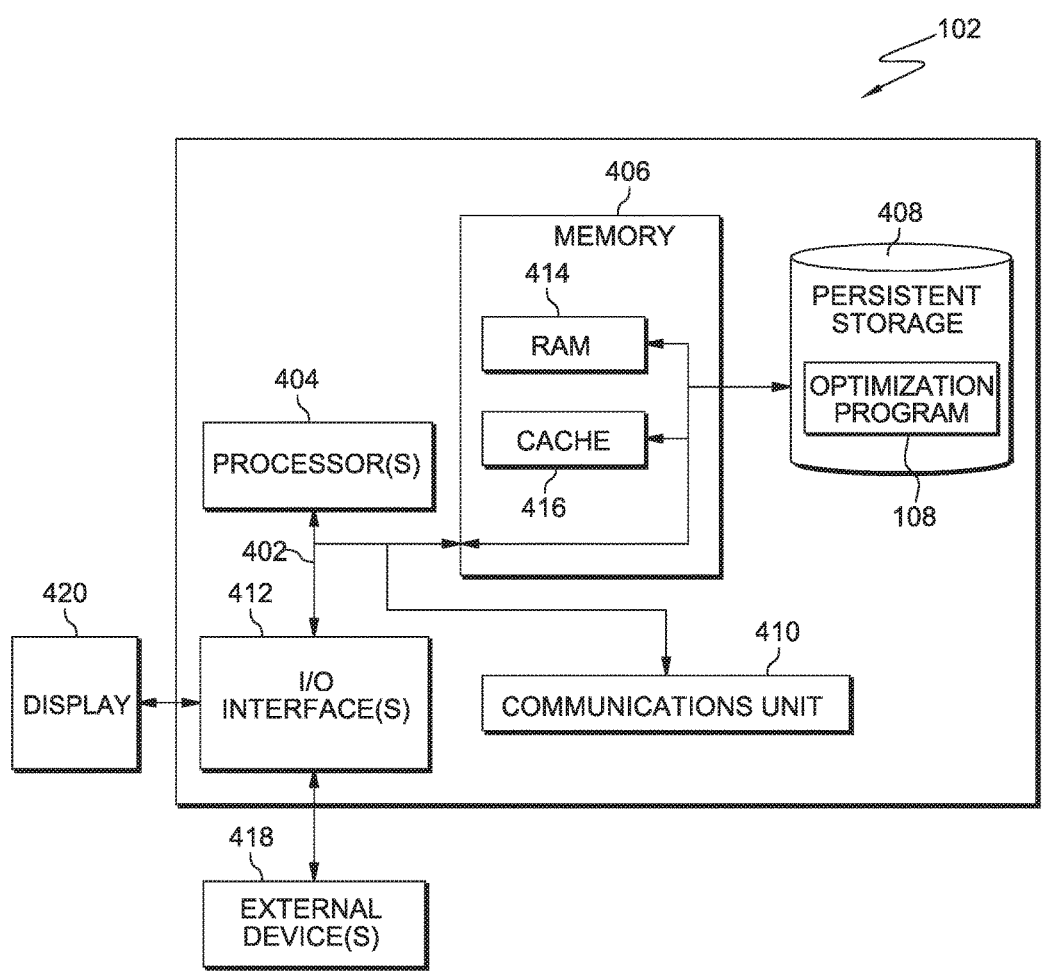
FIG. 4 is a block diagram of components of a computer system, such as the computer server of FIG. 1, in accordance with an embodiment of the present invention.

FIG. 4 depicts a block diagram of components of a computer, such as server computer 102, operating optimization program 108 within distributed data processing environment, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are examples of computer-readable tangible storage devices. A storage device is any piece of hardware that is capable of storing information, such as, data, program code in functional form, and/or other suitable information on a temporary basis and/or permanent basis. In this embodiment, memory 406 includes random access memory (RAM) 414 and cache memory 416. In general, memory 406 can include any suitable volatile or non-volatile computer-readable storage device.

Optimization program 108 is stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as optimization program 108, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for determining workload placement in a computing environment, the method comprising:

receiving, by one or more processors, a plurality of workloads with associated information, wherein the associated information for each workload contains at least: contract information, billing information, and resource demand information;

determining, by one or more processors, a profitability factor for each workload of the plurality of workloads, wherein the profitability factor is at least based on the billing information;

determining, by one or more processors, a penalty factor for each workload of the plurality of workloads, wherein the penalty factor is at least based on the contract information;

determining, by one or more processors, a preference factor for each workload of the plurality of workloads, wherein the profitability factor and the penalty factor are utilized to determine the preference factor and the preference factor is at least based on the resource availability information and a preferred time of day for running each work workload;

receiving a request for priority ordering of workloads during a disaster recovery situation, wherein a limited recovery-window is available for high priority workloads;

responsive to receiving the request, assigning, by one or more processors, a priority ordering for each of the workloads from the plurality of workloads for backup during the disaster recovery situation based upon at least: the profitability factor, the penalty factor, and the preference factor; and performing, by one or more processors, a backup on the high priority workloads from the assigned priority ordering for each of the workloads from the plurality of workloads within the limited recovery-window.

2. The method of claim 1, wherein receiving a plurality of workloads with associated information, further comprises:
identifying, by one or more processors, each workload of the plurality of workloads; and
querying, by one or more processors, one or more modules for the associated information for each workload of the plurality of workloads.

3. The method of claim 1, further comprising:
determining, by one or more processors, to place a portion of the plurality of workloads in a computing environment, wherein the portion is based on the assigned priority ordering for the plurality of workloads; and
placing, by one or more processors, the plurality of workloads in the computing environment.

4. The method of claim 1, wherein the contract information includes an amount of resources provided for each workload compared to an agreed amount of resources in the contract information.

5. The method of claim 1, wherein the contract information includes a cost incurred for each instance of breaching the contract information.

6. The method of claim 1, wherein the billing information includes a ratio of service provider profit for each workload to service provider cost for each workload.

7. A computer program product for determining workload placement in a computing environment, the computer program product comprising:
one or more computer readable storage media;
program instructions stored on the one or more computer readable storage media, the program instructions comprising:
program instructions to receive a plurality of workloads with associated information, wherein the associated information for each workload contains at least: contract information, billing information, and resource demand information;
program instructions to determine a profitability factor for each workload of the plurality of workloads, wherein the profitability factor is at least based on the billing information;
program instructions to determine a penalty factor for each workload of the plurality of workloads, wherein the penalty factor is at least based on the contract information;
program instructions to determine a preference factor for each workload of the plurality of workloads, wherein the profitability factor and the penalty factor are utilized to determine the preference factor and the preference factor is at least based on the resource availability information and a preferred time of day for running each work workload;
program instructions to, receive a request for priority ordering of workloads during a disaster recovery situation, wherein a limited recovery-window is available for high priority workloads;
program instructions to, responsive to receiving the request, assign a priority ordering for each of the workloads from the plurality of workloads for backup during the disaster recovery situation based upon at least: the profitability factor, the penalty factor, and the preference factor; and
program instructions to perform a backup on the high priority workloads from the assigned priority ordering for each of the workloads from the plurality of workloads within the limited recovery-window.

8. The computer program product of claim 7, wherein receiving a plurality of workloads with associated information, further comprises program instructions, stored on the one or more computer readable storage media, which when executed by a processor, cause the processor to:
identify each workload of the plurality of workloads; and
query one or more modules for the associated information for each workload of the plurality of workloads.

9. The computer program product of claim 7, further comprising instructions, stored on the one or more computer readable storage media, which when executed by a processor, cause the processor to:
determine to place a portion of the plurality of workloads in a computing environment, wherein the portion is based on the assigned priority ordering for the plurality of workloads; and
place the plurality of workloads in the computing environment.

10. The computer program product of claim 7, wherein the contract information including an amount of resources provided for each workload compared to an agreed amount of resources in the contract information.

11. The computer program product of claim 7, wherein the contract information includes a cost incurred for each instance of breaching the contract information.

12. The computer program product of claim 7, wherein the billing information includes a ratio of service provider profit for each workload to service provider cost for each workload.

13. A computer system for managing methods for determining workload placement in a computing environment, the computer system comprising:
one or more computer processors;
one or more computer readable storage media;
program instructions stored on the one or more computer readable storage media, for execution by at least one of the one or more computer processors, the program instructions comprising:
program instructions to receive a plurality of workloads with associated information, wherein the associated information for each workload contains at least: contract information, billing information, and resource demand information;
program instructions to determine a profitability factor for each workload of the plurality of workloads, wherein the profitability factor is at least based on the billing information including a ratio of service provider profit for each workload to service provider cost for each workload;
program instructions to determine a penalty factor for each workload of the plurality of workloads, wherein the penalty factor is at least based on the contract information;
program instructions to determine a preference factor for each workload of the plurality of workloads, wherein the profitability factor and the penalty factor are utilized to determine the preference factor and the preference factor is at least based on the resource availability information and a preferred time of day for running each work workload;

program instructions to, receive a request for priority ordering of workloads during a disaster recovery situation, wherein a limited recovery-window is available for high priority workloads;

program instructions to, responsive to receiving the request, assign a priority ordering for each of the workloads from the plurality of workloads for backup during the disaster recovery situation based upon at least: the profitability factor, the penalty factor, and the preference factor; and program instructions to perform a backup on the high priority workloads from the assigned priority ordering for each of the workloads from the plurality of workloads within the limited recovery-window.

14. The computer system of claim 13, wherein receiving a plurality of workloads with associated information, further comprises program instructions, stored on the one or more computer readable storage media, which when executed by a processor, cause the processor to:
identify each workload of the plurality of workloads; and
query one or more modules for the associated information for each workload of the plurality of workloads.

15. The computer system of claim 13, further comprising instructions, stored on the one or more computer readable storage media, which when executed by a processor, cause the processor to:
determine to place a portion of the plurality of workloads in a computing environment, wherein the portion is based on the assigned priority ordering for the plurality of workloads; and
place the plurality of workloads in the computing environment.

16. The computer system of claim 13, wherein the contract information including an amount of resources provided for each workload compared to an agreed amount of resources in the contract information.

17. The computer system of claim 13, wherein the contract information includes a cost incurred for each instance of breaching the contract information.

* * * * *